US008847523B2

(12) United States Patent
Bringold et al.

(10) Patent No.: US 8,847,523 B2
(45) Date of Patent: Sep. 30, 2014

(54) ELECTRONIC DRIVE HAVING AN ELECTRO-MECHANICAL BRAKE

(75) Inventors: Remy Bringold, Lupsingen (CH); Klaus Pfeffer, Schopfheim (DE)

(73) Assignee: Aktiebolaget SLF, Gothenburg (SE)

( * ) Notice: Subject to any disclaimer, the term of this patent is extended or adjusted under 35 U.S.C. 154(b) by 32 days.

(21) Appl. No.: 13/304,970

(22) Filed: Nov. 28, 2011

(65) Prior Publication Data

US 2012/0139457 A1 Jun. 7, 2012

(30) Foreign Application Priority Data

Nov. 29, 2010 (DE) .......................... 10 2010 062 081

(51) Int. Cl.
*H02P 3/00* (2006.01)
*H02P 3/04* (2006.01)

(52) U.S. Cl.
CPC ........................................ *H02P 3/04* (2013.01)
USPC ............ 318/362; 318/276; 318/277; 303/124

(58) Field of Classification Search
USPC ................ 303/124; 180/275, 370; 188/24.14, 188/24.24; 318/362, 276, 277
See application file for complete search history.

(56) References Cited

U.S. PATENT DOCUMENTS

| 5,449,992 A * | 9/1995 | Geiger et al. ................. 318/362 |
| 6,291,951 B1 * | 9/2001 | Baulier ......................... 318/363 |
| 2008/0158923 A1 * | 7/2008 | Hopf et al. .................... 363/102 |
| 2011/0108386 A1 * | 5/2011 | Nurnberg et al. ............. 198/323 |

FOREIGN PATENT DOCUMENTS

| DE | 2326237 A1 | 12/1974 |
| DE | 19811151 A1 | 9/1999 |

* cited by examiner

*Primary Examiner* — Eduardo Colon Santana
*Assistant Examiner* — Bickey Dhakal
(74) *Attorney, Agent, or Firm* — Bryan Peckjian; SKF USA Inc. Patent Department

(57) ABSTRACT

An electronic drive includes an electro-mechanical brake associated with a direct-current motor. A first valve or diode connects one of the terminals of the direct-current motor with the first electrical terminal of the brake in a forward direction. A second valve or diode connects the other terminal of the direct-current motor with the first electrical terminal of the brake. A second electrical terminal of the brake is at least indirectly connected with a reference voltage.

20 Claims, 1 Drawing Sheet

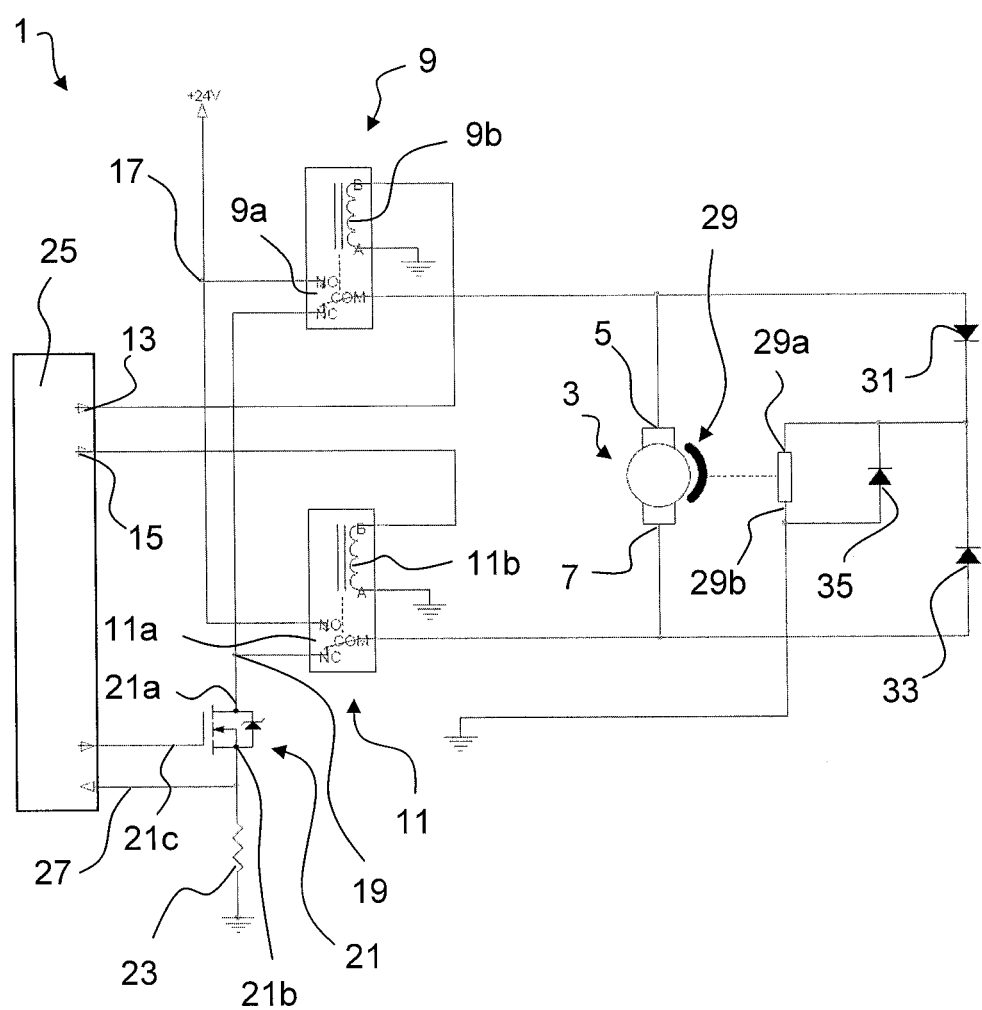

ELECTRONIC DRIVE HAVING AN ELECTRO-MECHANICAL BRAKE

TECHNICAL FIELD

The invention relates to an electronic drive having an electro-mechanical brake.

RELATED ART

In order to brake the electric motor of an electronic drive, electronically-controllable mechanical brakes (electro-mechanical brakes) can be used, which are controlled by a controller or regulator of the drive using electronics and/or electricity.

SUMMARY

It is an object of the invention to provide a simplified electronic drive having an electro-mechanical brake associated with the motor of the drive.

In one aspect of the present teachings, an electronic drive includes:
- an electronic direct-current motor having a first and a second electrical terminal,
- an electro-mechanical brake associated with the direct-current motor and having a first electrical terminal and a second electrical terminal, the latter of which is at least indirectly connected with a reference voltage,
- a first valve, which connects the first terminal of the direct-current motor with the first electrical terminal of the brake in the forward direction, and
- a second valve, which connects the second terminal of the direct-current motor with the first electrical terminal of the brake in the forward direction.

Thus, the electronic drive according to this aspect comprises the direct-current motor and the electro-mechanical brake associated with the direct-current motor; the brake may be embodied, in particular, as a stopping brake. According to the invention, the brake is connected with the terminals of the direct-current motor via the two valves, which can be embodied in particular as diodes. During operation of the electronic drive according to this aspect, the brake is supplied with electric current via the motor windings, i.e. the terminals of the direct-current motor, whereby the brake is driven to its disengaged position. Due to the connection of the valves, an electric current is applied to the brake as long as an electric current is applied at least to one of the terminals of the direct-current motor. The brake is then only current-less, i.e. it only holds the direct-current motor fixed and/or brakes it, when an electric current is applied to neither of the terminals of the direct-current motor. As a result, a relatively simple construction of the electronic drive is made possible.

The electronic drive according to this aspect can further include:
- a first controllable switch, which is configured, in a first position, to connect the first terminal of the direct-current motor with a first node, to which an electric direct current is applied during operation of the electronic drive, and, in a second position, to connect the first terminal of the direct-current motor with a second node,
- a second controllable switch, which is configured, in a first position, to connect the second terminal of the direct-current motor with the first node and, in a second position, to connect the second terminal of the direct-current motor with the second node, and
- a third controllable switch, which is configured, in a first position, to connect the second node at least indirectly with the reference voltage and, in a second position, to decouple the second node from the reference voltage.

By using the controllable switches, the electric current can be selectively applied to the first or to the second terminal of the direct-current motor according to the intended rotational direction of the direct-current motor. The other terminal of the direct-current motor can be connected with the reference voltage via the third controllable switch. The reference voltage can have, in particular, the electric potential 0V or can be ground.

The first controllable switch can be formed as a first relay, the second controllable switch can be formed as a second relay, and/or the third controllable switch can be formed as semiconductor switch, in particular as a transistor and preferably as a FET (Field-Effect Transistor).

The electro-mechanical brake can have an inductance. In order to create a current path for the electrical current of the inductance when the brake is switched-on, i.e. when the applied electric current is switched off to it, a flyback diode can be connected in parallel to the electrical terminals of the brake.

The electronic drive according to this aspect can include a controller device, which is configured to control the first controllable switch, the second controllable switch and the third controllable switch. Based on the different control states, the controller device can activate and deactivate the direct-current motor and the brake.

According to an embodiment of the inventive electronic drive, the controller device is configured, in a first operational state, to drive the first, the second and the third controllable switches to their second positions. As a result, an electric current is applied to none of the terminals of the direct-current motor and the direct-current motor is short-circuited. As a result, the brake is also current-less and thus holds the direct-current motor fixed. According to this embodiment, the controller device is further configured to subsequently switch either the first or the second controllable switch to its first position. As a result, the electric current of the first node is applied to the terminals of the direct-current motor, whereby an electric current is also applied to the brake, whereby it disengages. However, because the third controllable switch disconnects the second node from the reference voltage, the direct-current motor remains still. According to this embodiment, the controller device is further configured to switch the third controllable switch to its first position with a time delay. As a result, the second node is at least indirectly connected with the reference voltage, whereby the direct-current motor begins to rotate.

According to a further variant of the inventive electronic drive, the controller device is configured, in a second operational state, after the third controllable switch has been brought to its first position, to pulse it such that it switches in an alternating manner from its first to its second position. The electrical output of the direct-current motor is thereby adjusted, if necessary regulated, in order to, e.g., control or regulate the speed of the direct-current motor.

According to a further embodiment of the inventive electronic drive, the controller device is configured, in a third operational state, to bring the first and the second controllable switches to their first positions and, in necessary, to bring the third controllable switch to its second position. As a result, the direct current is applied to both terminals of the direct-current motor, whereby the direct-current motor is short-circuited and is electronically braked. However, at the same time, an electric current is applied to the brake due to the first and second valve, so that it remains disengaged. According to this embodiment, the controller device is further configured, in a time-delayed manner or after the direct-current motor no longer rotates, to bring the first and the second controllable switch to their second positions. As a result, no voltage is applied to the brake any more, whereby it actuates.

BRIEF DESCRIPTION OF THE DRAWING

An exemplary embodiment of the invention is illustrated in an exemplary manner in the appended schematic drawing, and the sole FIGURE shows a block circuit diagram of an electronic drive having a brake for the motor of the electronic drive.

DETAILED DESCRIPTION OF THE INVENTION

The electronic drive 1 illustrated in the FIGURE includes an electric motor 3 having terminals 5, 7. The electric motor 3 is a direct-current motor, which is embodied, e.g., as a brush-free direct-current motor.

In the case of the present exemplary embodiment, the electronic drive 1 includes a controllable first switch, which is embodied in particular as a first relay 9, and a second controllable switch, which is embodied in particular as a second relay 11. The two relays 9, 11 each comprise a switch element 9a, 11a, which can be switched between two positions by a coil 9b, 11b. One of the terminals of the coils 9b, 11b is, e.g., connected to earth and/or ground and the other terminal 13, 15 is connected with a controller device 25 of the electronic drive 1.

In the case of the present exemplary embodiment, the electronic drive 1 includes a first node 17, via which the electric motor 3 can be supplied with an electric current, in particular an electric direct-current voltage of, e.g., 24V. A second node 19 of the electronic drive 1 is connected with a third controllable switch, which is embodied, e.g., as a semiconductor switch, in particular as a transistor and preferably as a FET (Field-Effect Transistor) 21. The drain 21a of the FET 21 is connected with the second node 19 and the source 21b of the FET 21 is connected with earth and/or ground via a resistor 23. The FET 21 can be switched between its conducting and its non-conducting state through the gate 21c of the FET 21, which is connected with the controller device 25. In its conducting state, the second node 19 is connected to earth and/or ground via the resistor 23. It is possible to provide to the controller device 25 a value of the electric current flowing through the FET 21 by using a current measuring device 27 connected with the controller device 25.

In the case of the present exemplary embodiment, the electronic drive 1 includes an electro-mechanical brake 29 associated with the motor 3, which brake 29 is embodied as a stopping brake. In particular, the motor 3 can be held fixed in its stationary state by the brake 29.

The brake 29 is situated in its disengaged position when an electric current, in particular, a direct-current voltage, is applied to it. If the brake 29 is without current, i.e. no electric current is being applied to the brake 29, then the brake 29 is applied or remains applied in order to hold the motor 29 fixed.

The brake 29 comprises two electrical terminals 29a, 29b, of which one of the terminals 29a is connected with the cathode of a first diode 31 and with the cathode of a second diode 33. The other terminal 29b of the brake 29 is connected to ground. The anode of the first diode 31 is connected with one of the terminals 5 of the motor 3 and the anode of the second diode 33 is connected with the other terminal 7 of the motor 3. A third diode 35 is connected in parallel to the brake 29 and is provided as a flyback diode.

The controller device 25 of the electronic drive 1 can be configured to operate, e.g., as follows:

For example, if the motor 3 is still, then the controller device 25 controls the two relays 9, 11 such that these are switched so that the two terminals 5, 7 of the motor 3 are connected with the second node 19. This state is shown in the FIGURE. Thus, no electric current flows across the terminals 5, 7 of the motor, whereby no electric current is applied to the electro-mechanical brake 29 and thus the brake 29 engages and holds the motor 3 still. Moreover, the FET 21 is biased to its non-conductive state, so that the second node 19 is not connected to ground via the resistor 23, i.e. it is decoupled from ground.

If the motor 3 should be moved, then the controller device 25 switches, according to the intended rotational direction of the motor 3, either the first relay 9 or the second relay 11 in order to connect the corresponding terminal 5, 7 of the motor 3 with the first node 17 and thus to supply the corresponding terminal 5, 7 with the electric direct current. For example, if the first relay 9 is switched, then the electric direct current is applied to the terminal 5, and if the second relay 11 is switched, the direct current is applied to the terminal 7. Due to the first and second diode 31, 33, the direct current is applied to the brake 29, independent of which relay 9, 11 is switched, whereby the brake 29 is disengaged.

Thereafter, the controller device 25 switches the FET 21 with a time delay in order to connect the terminal 5, 7 of the motor 3, which terminal is still connected with the second node 19, to ground via the resistor 23. The electric circuit comprising the motor 3 is thereby closed, whereby the motor 3 starts to rotate. The electric output of the motor 3 can be controlled, if necessary also regulated, by the controller device 25 by pulsing the FET 21, e.g., based on pulse width modulation (PWM).

If the motor 3 should be stopped, e.g., in order to change its rotational direction, then in the case of the present exemplary embodiment the controller device 25 switches the respective relay 9, 11, which is not yet switched, so that both relays 9, 11 are switched and both terminals 5, 7 of the motor 3 are connected with the first node 17. As a result, the same DC voltage is applied to both terminals 5, 7 and the motor 3 is short-circuited. As a result, it stops. Due to the first diode 31 and the second diode 33, the direct current is applied to the electrical terminal 29a of the brake 29 for this operational state, whereby it remains disengaged. The FET 21 is also controlled by the controller device 25 such that it is non-conducting in order to decouple the second node 19 from ground.

After a predetermined time or when the motor 3 has come to a standstill, the controller device 25 controls the two relays 9, 11 so that these switch into their switched position shown in the FIGURE, i.e. the two terminals 5, 7 of the motor 3 connect with the second node 19. As a result, the motor 3 remains short-circuited and no electric current is applied to the brake 29 anymore, whereby it is applied and thus it holds the motor 3 fixed. Due to the third diode 35, which is embodied as a flyback diode, electric current stored in an inductance of the brake 29 can flow, if necessary.

Reference Number List
1 Electronic drive
3 Motor
5, 7 Terminal
9, 11 Relay
9a, 11a Switch element
9b, 11b Coil 13, 15 Terminal
17, 19 Node
21 FET
21a Drain
21b Source
21c Gate
23 Resistor
25 Controller device
29 Brake
29a, 29b Terminal
31, 33, 35 Diode

The invention claimed is:

1. A drive, including:
    a direct-current motor having a first and a second electrical terminal,
    an electro-mechanical brake associated with the direct-current motor and having a first electrical terminal and a second electrical terminal, the second electrical terminal being at least indirectly connected with a reference voltage,
    a first electronic valve electrically coupled with the first terminal of the direct-current motor and the first electrical terminal of the brake, the first electronic valve being configured to only permit current to flow from between the first terminal of the direct-current motor to the first electrical terminal of the brake only in a forward direction of the first electronic valve, and
    a second electronic valve electrically coupled with the second terminal of the direct-current motor and the first electrical terminal of the brake, the second electronic valve being configured to only permit current to flow from between the second terminal of the direct-current motor to the first electrical terminal of the brake only in a forward direction of the second electronic valve,
    wherein the electro-mechanical brake is configured to engage and stop the direct-current motor when no current is flowing across the first and second electrical terminals of the direct-current motor.

2. The drive according to claim 1, further including:
    a first node, to which a DC voltage different from the reference voltage is applied during operation of the drive,
    a second node electrically connectable with the reference voltage,
    a first controllable switch having a first state, in which the first terminal of the direct-current motor is connected with the first node, and a second state, in which the first terminal of the direct-current motor is connected with the second node,
    a second controllable switch having a first state, in which the second terminal of the direct-current motor is connected with the first node, and a second state, in which the second terminal of the direct-current motor is connected with the second node, and
    a third controllable switch having a first state, in which the second node is at least indirectly connected with the reference voltage, and a second state, in which the second node is disconnected from the reference voltage.

3. The drive according to claim 1, wherein:
    the reference voltage has a voltage of 0V or is ground, and
    a flyback diode is connected in parallel to the first and second electrical terminals of the brake.

4. The drive according to claim 1, wherein the first electronic valve comprises a first diode and the second electronic valve comprises a second diode.

5. The drive according to claim 2, wherein the first controllable switch comprises a first relay, the second controllable switch comprises a second relay and the third controllable switch comprises a semiconductor switch.

6. The drive according to claim 2, further including:
    a controller configured to control the first controllable switch, the second controllable switch and the third controllable switch.

7. The drive according to claim 2, further including:
    a controller configured to control the first controllable switch, the second controllable switch and the third controllable switch.

8. The drive according to claim 5, wherein the third controllable switch comprises a field-effect transistor.

9. The drive according to claim 8, wherein:
    the reference voltage has a voltage of 0V or is ground, and
    a flyback diode is connected in parallel to the first and second electrical terminals of the brake.

10. The drive according to claim 9, wherein the first electronic valve comprises a first diode and the second electronic valve comprises a second diode.

11. The drive according to claim 6, wherein the controller in a first operational state is configured to:
    drive the first, the second and the third controllable switches into their second states, respectively,
    subsequently switch one of the first controllable switch and the second controllable switch into its first state, and
    thereafter switch the third controllable switch into its first state with a time delay.

12. The drive according to claim 11, wherein the controller is configured, after concluding the first operational state and after the third controllable switch has been brought into its first state, to:
    pulse the third controllable switch such that it switches in an alternating manner between its first state and its second state.

13. The drive according to claim 6, wherein the controller in a third operational state is configured to bring the first and the second controllable switch into their first states, to bring the third controllable switch into its second state and, in a time-delayed manner or after the direct-current motor no longer rotates, to bring the first and the second controllable switch into their second states, respectively.

14. The drive according to claim 7, wherein the controller is configured, in a first operational state, to:
    drive the first, the second and the third controllable switches into their second states, respectively,
    subsequently switch one of the first controllable switch and the second controllable switch into its first state, and
    thereafter switch the third controllable switch into its first state with a time delay.

15. The drive according to claim 14, wherein the controller is configured, after concluding the first operational state and after the third controllable switch has been brought into its first state, to:
    pulse the third controllable switch such that it switches in an alternating manner between its first state and its second state.

16. The drive according to claim 15, wherein the controller is configured, in a third operational state, to bring the first and the second controllable switch into their first states, to bring the third controllable switch into its second state and, in a time-delayed manner or after the direct-current motor no longer rotates, to bring the first and the second controllable switch into their second states, respectively.

17. A drive, including:
    a direct-current motor having a first electrical terminal and a second electrical terminal, an electro-mechanical brake having a first electrical terminal and a second electrical terminal, the second electrical terminal being electrically coupled to a reference voltage, a first diode having a cathode electrically coupled to the first terminal of the brake and an anode electrically coupled to the first electrical terminal of the direct-current motor, and a second diode having a cathode connected to the first electrical terminal of the brake and an anode connected to the second terminal of the direct-current motor, wherein the electro-mechanical brake is configured to engage and stop the direct-current motor when no current is flowing across the first and second electrical terminals of the direct-current motor and to disengage from the direct-current motor when a current is flowing across the first and second electrical terminals of the direct-current motor.

18. The drive according to claim 17, further including:

a first node, to which a DC voltage different from the reference voltage is applied during operation of the drive, a second node electrically connectable with the reference voltage, a first relay configured to be switchable between a first state and a second state, wherein in the first state the first terminal of the direct-current motor is connected with the first node, and in the second state the first terminal of the direct-current motor is connected with the second node, a second relay configured to be switchable between a first state and a second state, wherein in the first state the second terminal of the direct-current motor is connected with the first node, and in the second state the second terminal of the direct-current motor is connected with the second node, and a field-effect transistor configured to switch between a first state and second state, wherein in the first state the second node is electrically coupled with the reference voltage, and in the second state the second node is disconnected from the reference voltage.

19. The drive according to claim 18, further including:

a flyback diode connected in parallel to the first and second electrical terminals of the brake.

20. The drive according to claim 19, further including:

a controller configured to control the first relay, the second relay and the field-effect transistor, the controller being configured to:

switch each of the first relay, the second relay and the field-effect transistor into their second states, subsequently switch one of the first relay and the second relay into its first state, then switch the field-effect transistor into its first state after a time delay and then pulse the field-effect transistor such that it switches in an alternating manner between its first state and its second state.

* * * * *